(12) United States Patent
Martel et al.

(10) Patent No.: US 6,416,269 B1
(45) Date of Patent: Jul. 9, 2002

(54) FASTENER FOR SECURING DECKING BOARDS TO AN UNDERLYING SUPPORTING MEMBER

(76) Inventors: David Martel, 20 Coventry La., Harwinton, CT (US) 06791; David Young Hartmann, 7980 Fall Creek Rd. #105, Dublin, CA (US) 94568

( * ) Notice: Subject to any disclaimer, the term of this patent is extended or adjusted under 35 U.S.C. 154(b) by 0 days.

(21) Appl. No.: 09/697,411

(22) Filed: Oct. 25, 2000

(51) Int. Cl.⁷ .............................. F16B 15/00; E04B 12/05
(52) U.S. Cl. .................... 411/461; 411/458; 52/480; 52/715
(58) Field of Search ............ 52/715, 840; 411/457–468

(56) References Cited

U.S. PATENT DOCUMENTS

| | | | | |
|---|---|---|---|---|
| 2,065,525 A | * | 12/1936 | Hamilton | |
| 2,129,975 A | * | 9/1938 | Urbain | |
| 2,214,939 A | * | 9/1940 | Stirn | |
| 2,620,705 A | * | 12/1952 | Podinecz | |
| 4,052,831 A | * | 10/1977 | Roberts | |
| 5,842,319 A | * | 12/1998 | Ravetto | 52/715 |

* cited by examiner

Primary Examiner—Flemming Saether
(74) Attorney, Agent, or Firm—McCormick, Paulding & Huber LLP

(57) ABSTRACT

The invention resides in a fastener for securing a first board to an underlying supporting member and to at least one other board running adjacent and parallel to the first board. The fastener has a thin flat body portion having front and rear faces, with a first prong extending outwardly from the front face of the body portion for driving into a first board. The fastener also includes a second prong extending outwardly from the rear face of the body portion for penetrating a second board, with the second prong running adjacent and parallel to in a direction opposite from that of the first prong. The body portion of the fastener has an opening for receiving a connector through the opening which is inclined to and passes through the body portion for fastening the body portion to a supporting member which supports and underlies the first and second boards.

18 Claims, 3 Drawing Sheets

FASTENER FOR SECURING DECKING BOARDS TO AN UNDERLYING SUPPORTING MEMBER

FIELD OF THE INVENTION

The invention concerns a deck fastener for securing deck boards together and to a supporting member, and deals more particularly with a deck fastener which does not protrude from the deck surface.

BACKGROUND OF THE INVENTION

Brackets, clips, and anchors for securing boards to joists without nail or screw heads protruding from the deck surface are known. However, some of these deck fastening systems require securing devices which are difficult to install or require extensive preparation, such as preinstalling tracks on joists, predrilling slots or holes in boards for fasteners, or gluing the boards to the joists. Other deck fastening systems must be installed from below the deck, a time consuming, expensive, and, depending upon the location of the deck, sometimes impossible procedure.

While these deck fastening systems are designed to prevent nails or screws from appearing on the deck surface, many of the parts of the systems are quite apparent from beneath the deck. Since a deck is often located over a cellar entrance or off a second floor, the underside of such a deck is also in view, and the display of protruding fasteners and/or other components is unsightly and possibly dangerous.

Since deck boards are subject to warping, splitting and shrinking, some of the known deck fastener systems do not prevent the deck boards from separating from the support joists over time. The fasteners also can come loose or become out of position on the joists. The separating of the boards from the joists may allow the boards to protrude above the deck surface, making the deck unsightly and less usable.

The object of the present invention is, therefore, to provide an improved deck fastener which, among other desirable attributes, significantly reduces or overcomes the above-mentioned deficiencies of prior deck fasteners, and which in particular is relatively easy and inexpensive to manufacture and is easy to use.

SUMMARY OF THE INVENTION

The invention resides in a fastener for securing a first board to an underlying supporting member and to at least one other board running adjacent and parallel to the first board. The fastener has a thin flat body portion having front and rear faces, with a first prong extending outwardly from the front face of the body portion for driving into a first board. The fastener also includes a second prong extending outwardly from the rear face of the body portion for penetrating a second board, with the second prong running adjacent and parallel to, and in a direction opposite from, that of the first prong. The body portion of the fastener has an opening for receiving through the opening a shank portion of a connector which is inclined to and passes through the body portion, with the connector also having a head portion which engages the body portion adjoining the opening, for fastening the fastener to a supporting member which supports and underlies the first and second boards.

A further feature of the invention is that a third prong extends outwardly from a bottom edge of the body portion of the fastener for spacing the body portion of the fastener away from the supporting member so that the fastener and the attached first board can be drawn down to the supporting member during installation of the connector in the event the first board is slightly raised from the supporting member when the fastener is driven into the first board.

Another feature of the invention is the approximately conical shape of the opening so that a head of the connector, such as a screw, can be partially inserted within the opening to reduce the amount of screw head protruding from the opening and thereby permit a close positioning of adjoining boards.

Other features and advantages of the invention will be apparent from the following detailed description of a preferred embodiment of the invention, and from the accompanying drawings and claims.

DETAILED DESCRIPTION OF THE PREFERRED EMBODIMENTS

Figure 1:
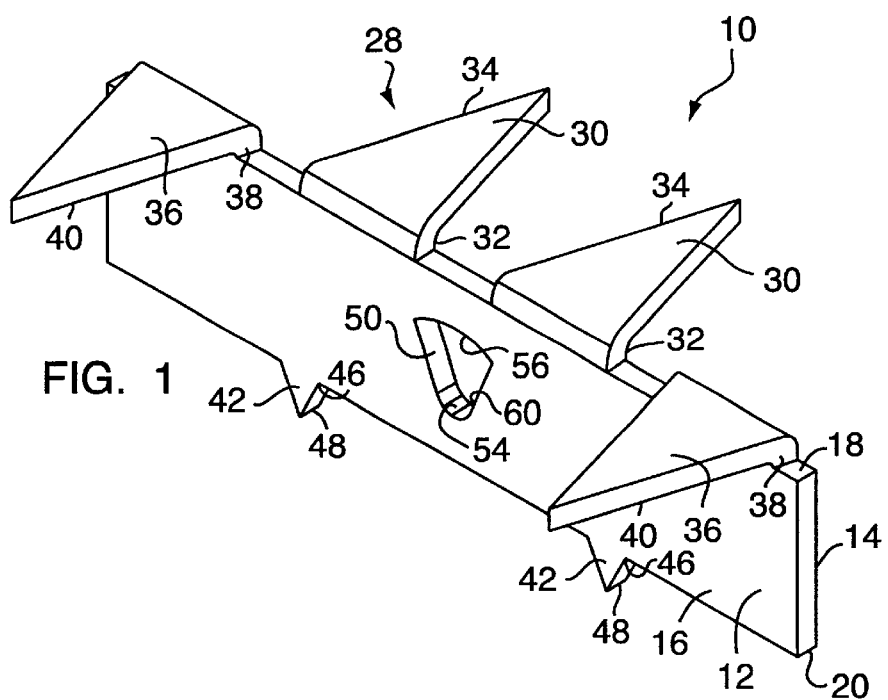
FIG. 1. A perspective view of a deck fastener embodying the present invention.

Referring to FIG. 1, a deck fastener 10 embodying the invention has a thin, flat body portion 12 having front 14 and rear 16 faces, and top 18 and bottom 20 edges. The body portion 12 is preferably about 2.25" long and 0.5" wide and is preferably made of a piece of cut and bent sheet metal, preferably of 0.06" half-hardened steel which is rolled and not heat treated.

Figure 2:
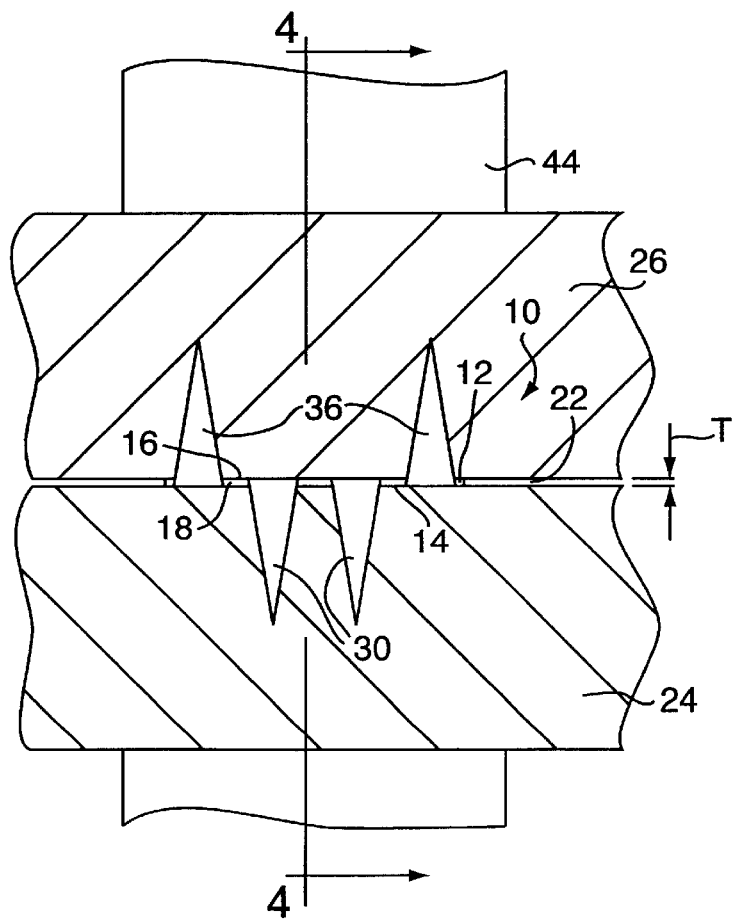
FIG. 2. A fragmentary sectional view of the deck fastener of FIG. 1 retaining a first deck board to a second deck board.

As best shown in FIG. 2, the thickness T of the body portion 12 provides a gap 22 between a first deck board 24 and a second deck board 26 for drainage, especially since the gap will widen as the boards shrink over time. The body portion 12 and remaining portions 28 of the deck fastener 10 are coated with a black phosphorous electric "e" coat HV3 oil finish for corrosion resistance and to hide the body portion in the shadows created in the gap 22 between the adjoining deck boards 24, 26.

Referring to FIGS. 1 and 2, first prongs 30 extend outwardly from the top edge 18 of the front face 14 of the body portion 12 for driving into a first deck board 24. Preferably, there are two first prongs 30 which are approximately parallel to each other and approximately perpendicular to the body portion 12. The first prongs 30 are approximately wedge shaped, with a base 32 of the each prong 30 contiguous to the top edge 18 of the body portion. Preferably, the first prongs 30 extend outwardly ⅝" and are ⅜" wide at the base 32. The first prongs 32 have non-tapered edges 34 for penetrating the material of the decking boards 24, 26, such as wood or composite material. The first prongs 30 are spaced approximately ¼" apart on the body portion 12. While two first prongs have been shown and described, the present invention is not so limited, as there may be only a single prong, or three or more prongs, extending from the front face of the body portion, without departing from the broader aspects of the present invention.

Still referring to FIGS. 1 and 2, second prongs 36 extend outwardly from the rear face 16 of the body portion 12 for being driven into and penetrating a second board 26 for securing the second board to the body portion. Preferably, there are two second prongs 36 which are approximately parallel to each other and approximately perpendicular to the body portion 12, and the second prongs run adjacent and parallel to the first prongs 30, in a direction opposite from that of the first prongs. The second prongs 36 are approximately wedge shaped, with a base 38 of each second prong 36 contiguous to the top edge 18 of the body portion 12. Preferably, the second prongs 36 extend outwardly from the body portion 12 about ⅝" and are ⅜" wide at the base 38. The second prongs 36 have non-tapered edges 40 for penetrating the material of the decking boards 26, such as wood or composite material.

As shown in FIGS. 1 and 2, the two second prongs 36 are spaced apart on the body portion 12, preferably about 1⅜", so that a head of a hammer may fit between the second prongs to impact the rear face 16 of the body portion and drive the first prongs 30 into the first board 24 without interference from the second prongs. While two second prongs have been shown and described, the present invention is not so limited, as there may be only a single prong, or three or more prongs, extending from the rear face of the body portion, without departing from the broader aspects of the present invention.

Continuing to refer to FIGS. 1 and 2, third prongs 42 extend outwardly from the bottom edge 20 of the body portion 12 in a direction parallel to the body portion for spacing the body portion away from a supporting member 44, such as a joist 44, in order to draw down the body portion and the first board 24 to the joist. Preferably, there are two third prongs 42 which are approximately parallel to each other and approximately parallel to the body portion 12. Preferably, the third prongs 42 are spaced apart, preferably about ⅞", so that the body portion 12 can be easily positioned on the joist 44. The two third prongs 42 are supported upon the joist 44 and space the body portion 12 from the joist, for driving the first prongs 30 into the first board 24.

Referring to FIG. 1, the third prongs 42 are approximately wedge shaped, with a base 46 of each third prong adjacent to the bottom edge 20 of the body portion 12. Preferably, each third prong 42 extends outwardly ³⁄₁₆" from the body portion 12 and is ⅛" wide at the base 46. The third prongs 42 have non-tapered edges 48 for penetrating the material of the supporting member 44, such as wood or composite material. While two third prongs have been shown and described, the present invention is not so limited, as there may be only a single prong, or three or more prongs, extending from the bottom edge of the body portion, without departing from the broader aspects of the present invention.

Figure 3:
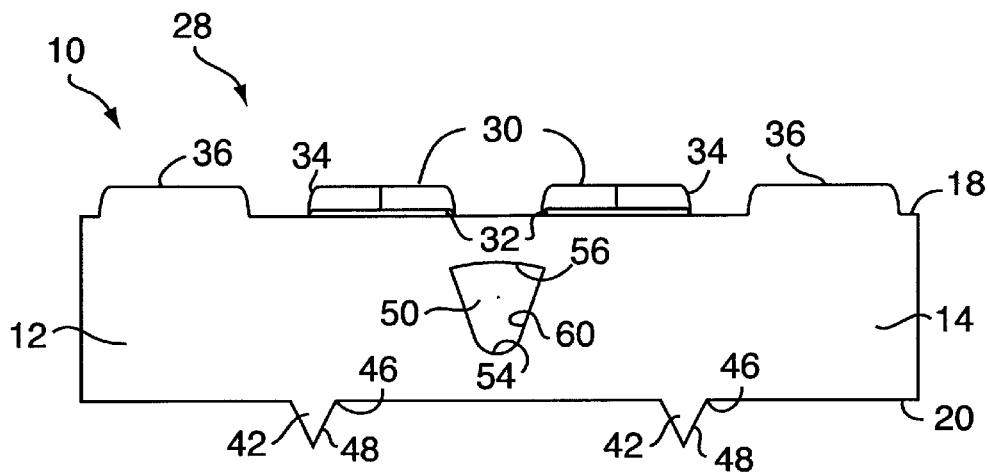
FIG. 3. A plan view of the deck fastener of FIG. 1.
Figure 4:
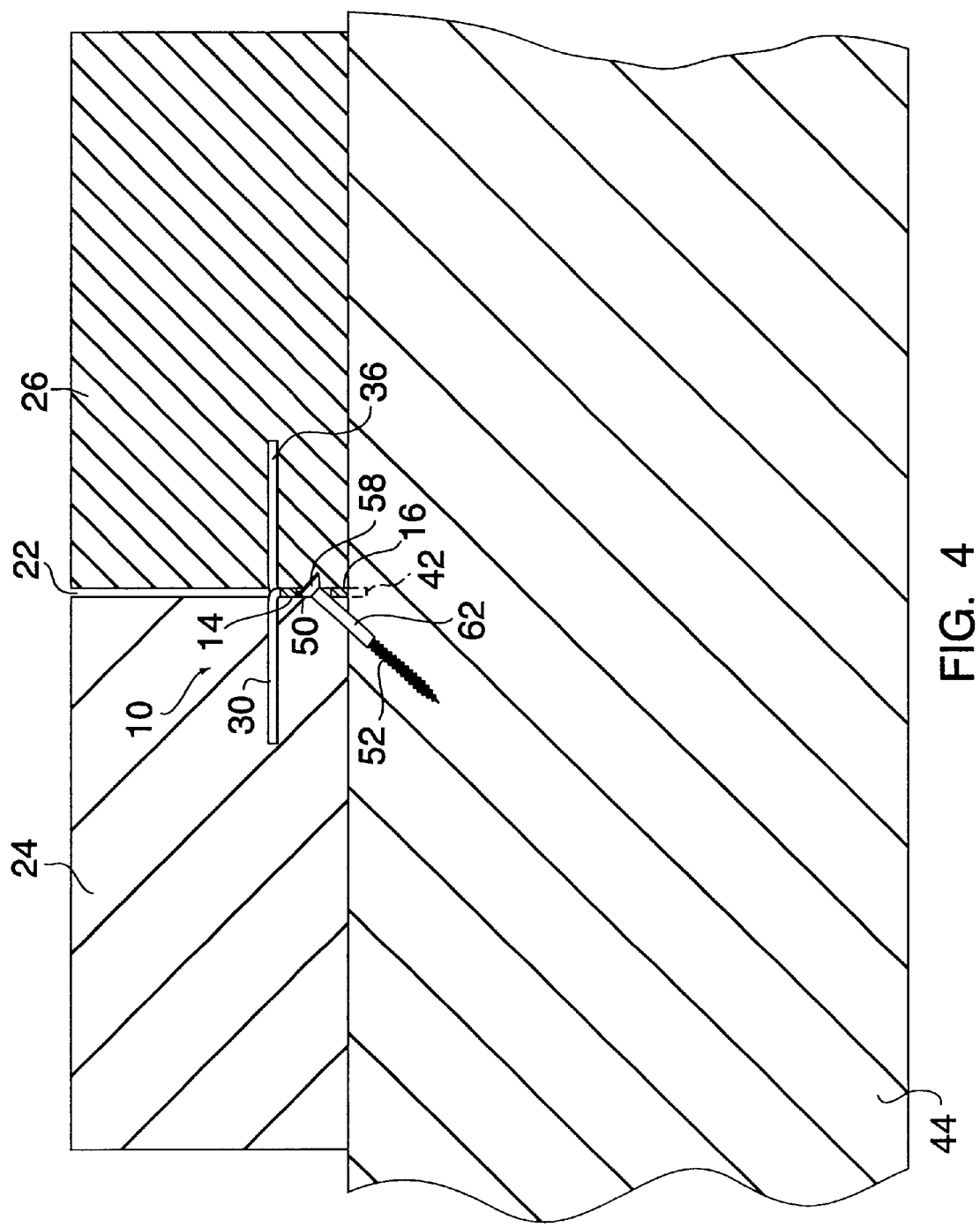
FIG. 4. A fragmentary sectional view of the deck fastener along the line 4—4 of FIG. 2 showing retaining two boards to a support member with a fastening connector.

As shown in FIGS. 3 and 4, the body portion 12 defines an opening 50 for passing a connector 52, such as a screw 52, for fastening the body portion 12 to the joist 44. The opening 50 is conically shaped with a truncated vertex 54 oriented towards the bottom edge 20 of the body portion 12, and approximately centered within the body portion. The opening 50 has an arced top edge 56 for permitting the head 58 of the inclined screw 52 to partially fit through the opening, thereby reducing the amount of screw head protruding from the rear face 16 of the body portion 12. The opening 50 prevents the screw head 58 from completely passing through the body portion 12. The reduction in screw head 58 protrusion permits a dose abutment of the first deck board 24 and the second deck board 26.

Referring to FIG. 4, the body portion 12 defining the tapered bottom 60 of the opening 50 permits the body portion to grasp a shank 62 of the screw 52 and fasten the body portion to the supporting member 44. The connector 52 is preferably a 1⅝" or 2" galvanized deck screw 52, having a no. 6 thickness and a course thread. The screw 52 is inclined at about a 45 degree angle to the body portion 12 as the screw passes through the body portion, the first board 24, and into the joist 44. While a screw has been shown and described, the present invention is not so limited, as other connectors and fasteners which can connect the body portion of the fastener to the joist, such as a nail, can be employed without departing from the broader aspects of the invention.

Referring to FIGS. 2 and 4, in operation, the first deck board 24 is secured to the joist 44 with the fastener 10 at the location where the first board overlaps, crosses, or is supported by the joist. The first deck board 24 is placed over the joist 44 where it is to be secured. While the joist is shown perpendicular to the body portion and the first and second boards, the present invention is not so limited, as the fastener is also employed with deck boards laid diagonally over the joist, or at any other angle in which a board overlaps a joist, without departing from the broader aspects of the present invention.

As shown in FIGS. 3 and 4, the body portion 12 of the fastener 10 is centered on the joist 44 and the first deck board 24 crossing the joist, with the body portion parallel to the first deck board and the front face 14 of the body portion facing the first board. The body portion 12 is positioned so that the third prongs 42 extending from the bottom edge 20 of the body portion lie against the center of the supporting member 44. The first prongs 30 which extend outwardly from the front face 14 are positioned against the first board 24, and the first prongs are driven into the first board by hammering the rear face 16 of the body portion between the second prongs 36 extending from the rear face of the body portion.

Continuing with FIGS. 3 and 4, the connector 52, is inserted in the opening 50 in the body portion 12 and is indined and passes through the body portion at about a 45 degree angle. The screw 52 passes through the first board 24 and into the underlying supporting member 44, drawing the body portion 12, and therefore the first prongs 30 and the first board, against the joist. The screw also draws the third prongs 42 into the joist. The third prongs 42 prevent the body portion 12 of the fastener 10 from being shifted or displaced from the center of the joist 44 even if the boards 24, 26 or joist 44 shrink, crack or warp. The spacing provided by the third prongs 42 allows the first board 24 to be drawn against the joist 44 even if the first board was not lying tightly against the joist when the first prongs 30 were driven into the first board.

Referring to FIGS. 3 and 4, the connector 52 secures the body portion 12 of the fastener 10 to the joist 44, and does not rely upon directly securing the first board 24 to the joist. This method of fastening prevents the boards 24, 26 from lifting or raising as the boards shrink, crack or warp. The second board 26 is then positioned over the joist 44, parallel and adjacent to the first board 24, and is driven onto the second prongs 36 extending outwardly from the rear face 16 of the body portion 12, securing the second board to the body portion and the first board.

Figure 5:
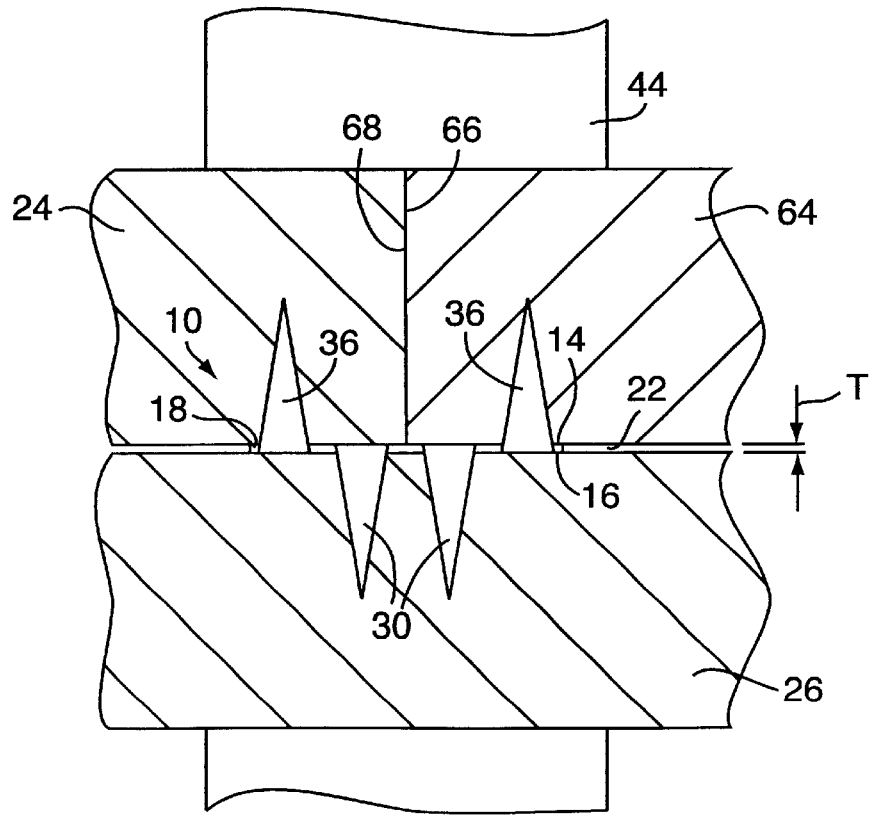
FIG. 5. A fragmentary sectional view of the deck fastener of FIG. 1 joining a first board to a third board at their end sections.

As shown in FIG. 5, sometimes a width of a deck is larger than the length of boards used in building the deck, so it is necessary to position and secure two boards, such as the first board 24 and a third board 64, together at their end sections 66, 68. To secure the end sections 66, 68 of the boards 24, 64 together, the end sections of the boards are positioned adjacent to each other over the joist 44. The body portion 12 of the fastener 10 is reversed from its previously described usage, and the second prongs 36 extending from the rear face 16 of the body portion are driven into end sections 66, 68 of the two boards 24, 64. The second prongs 36 extending from the rear face 16 are spaced wider apart from each other than are the first prongs 30 extending from the front face 14. The use of the wider second prongs 36 to secure the ends sections 66, 68 of the two boards 24, 64 together causes less splintering of the end sections of the boards, and makes it easier to have the prongs completely embedded within the first and third boards.

Still referring to FIG. 5, the body portion 12 of the fastener 10 is secured to the joist 44 with the connector 52, and the second board 26 is positioned over the joist, parallel and adjacent to the joined first board 24 and third board 64. The second board 26 is driven onto the first prongs 30 extending outwardly from the front face 14 of the body portion 12, securing the second board to the body portion, the first board 24, and the third board 64.

It should be understood that the foregoing description is only illustrative of the invention. Various alternatives and modifications can be devised by those skilled in the art without departing from the broader aspects of the present invention. For instance, while wedge-shaped prongs with non-tapered edges have been shown and described, prongs with tapered edges, and square, rectangular, or circular shapes are also within the broader aspects of the present invention. While securing a board to a joist with a fastener has been shown, the present invention is not so limited, as not every crossing of a board and a joist requires a fastener, and a fastener may be used in any location in which a joist and a board overlap, or two boards are to be secured together, without departing from the broader aspects of the present invention. Accordingly, the present invention encompasses a number of alternatives, modifications and variants that fall within the scope of the appended claims.

What is claimed is:

1. A fastener usable with an elongated connector for securing a first board to an underlying supporting member and to at least one other board running adjacent and parallel to the first board, said fastener being made entirely of a single piece of cut and bent sheet metal and comprising:

a thin flat body portion having front and rear faces and top and bottom edges, said top and bottom edges defining vertical limits of the body portion and the body portion extending vertically between said top and bottom edges;

a first prong extending outwardly from said front face of said body portion for driving into a first board;

a second prong extending outwardly from the rear face of said body portion for penetrating a second board, said second prong running adjacent and parallel to and in a direction opposite from that of said first prong;

said body portion having an opening capable of receiving an elongated connector inserted through said opening with said connector being inclined to and passing through said body portion for fastening said body portion to a supporting member supporting and underlying the first and second boards; and a third prong coplanar with the body portion and extending downwardly from said bottom edge of said body portion and having a pointed end spaced downwardly from said body portion bottom edge so that immediately prior to the driving of said first prong into the first board said pointed end of said third prong can be rested on said underlying supporting member to position said fastener vertically relative to said first board during the driving of said first prong into the first board, and then when said connector is applied to fasten the body member to the underlying supporting member said third prong can penetrate into said underlying supporting member to allow said first board to move downwardly closer to sad underlying supporting member, in the event said first board was spaced slightly upwardly from the underlying support member at the time of driving said first prong into said first board, without the bottom edge of the body portion hindering such downward movement of the first board closer to the underlying supporting member.

2. The fastener of claim 1, wherein said third prong extends parallel to said body portion.

3. The fastener of claim 1, wherein said third prong is wedge shaped.

4. The fastener of claim 1, wherein said third prong is one of two such third prongs extending downwardly from the bottom edge of the body portion and which two third prongs are spaced from one another along said bottom edge.

5. The fastener of claim 1, wherein said first prong is wedge shaped.

6. The fastener of claim 1, wherein said first prong extends perpendicular to said body portion.

7. The fastener of claim 1, wherein said first prong is one of two such first prongs spaced horizontally from one another.

8. The fastener of claim 1, wherein said second prong extends perpendicular to said body portion.

9. The fastener of claim 1, wherein said second prong is wedge shaped.

10. The fastener of claim 1, wherein said second prong is one of two such second prongs spaced horizontally from one another.

11. The fastener of claim 1, wherein said sheet metal of which said fastener is made is steel.

12. The fastener of claim 1, wherein:

said connector includes a head and a shank; and said opening is generally conically shaped so as to partially receive said head of said connector after said first prong has been driven into the first board and after said connector has then had said shank placed into the opening and has been driven into said first board and the underlying support member.

13. The fastener of claim 12, wherein said body portion defines said conically shaped opening with a vertex oriented toward said bottom edge of said body portion for receiving the shank of said connector.

14. The fastener of claim 1, wherein said connector is a screw with a threaded shank and a head.

15. A fastener for securing a first board to an underlying supporting member and to at least one other board running adjacent and parallel to the first board, said fastener comprising:

a thin flat body portion having front and rear faces;

a first prong extending outwardly from said front face of said body portion for driving into a first board;

a second prong extending outwardly from the rear face of said body portion for penetrating a second board, said second prong running adjacent and parallel to and in a direction opposite from that of said first prong;

a third prong coplanar with the body portion extending downwardly from a bottom edge of said body portion and having a pointed end spaced downwardly from said body portion bottom edge so that immediately prior to the driving of said first prong into the first board said pointed end of said third prong can be rested on said underlying supporting member to position said fastener vertically relative to said first board during the driving of said first prong into the first board, and then when a connector is applied to fasten the body member to the underlying supporting member said third prong can penetrate into said underlying support to allow said first board to move downwardly closer to said underlying supporting member, in the event said first board was spaced slightly upwardly from the underlying support member at the time of driving said first prong into said first board, without the bottom edge of the body portion hindering such downward movement of the first board closer to the underlying supporting member, and said body portion having an opening capable of receiving a connector inserted through said opening and which connector is inclined to and passes through said body portion for fastening said body portion to a supporting member supporting and underlying the first and second boards.

16. The fastener of claim 15, wherein said opening is generally conically shaped.

17. A fastener for securing a first board to an underlying supporting member and to at least one other board running adjacent and parallel to the first board, said fastener comprising:

a thin flat body portion having front and rear faces and top and bottom edges;

two first prongs spaced from one another along said top edge and extending outwardly from said front face of said body portion at said top edge for driving into a first board;

two second prongs spaced from one another along said top edge and extending outwardly from the rear face of said body portion at said top edge for penetrating a second board, said second prongs running parallel to and in a direction opposite from that of said first prongs;

said body portion having an opening located centrally of the body portion and capable of receiving an elongated connector inserted through said opening and which connector is inclined to and passes through said body portion for fastening said body portion to a supporting member underlying the first and second boards; and two downwardly extending third prongs coplanar with the body portion spaced from one another along said bottom edge and having pointed ends spaced downwardly from said bottom edge so that immediately prior to the driving of said first prongs into the first board said pointed ends of said third prongs can be rested on said underlying supporting member to position said fastener vertically relative to said first board during the driving of said first prongs into the first board, and then when a connector is applied to fasten the body portion to the underlying supporting member said third prongs can penetrate into said underlying supporting member to allow said first board to move downwardly closer to said underlying supporting member, in the event said first board was spaced slightly upwardly from the underlying support member at the time of driving said first prongs into said first board, without tie bottom edge of the body portion hindering such downward movement of the first board closer to the underlying supporting member.

18. The fastener of claim 17, wherein said two first prongs are located between said two second prongs.

* * * * *